US012432138B2

(12) United States Patent
Yelahanka Raghuprasad et al.

(10) Patent No.: US 12,432,138 B2
(45) Date of Patent: Sep. 30, 2025

(54) SELECTING PATHS FOR HIGH PREDICTABILITY USING CLUSTERING

(71) Applicant: Cisco Technology, Inc., San Jose, CA (US)

(72) Inventors: Mukund Yelahanka Raghuprasad, San Jose, CA (US); Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/538,194

(22) Filed: Nov. 30, 2021

(65) Prior Publication Data

US 2023/0171186 A1   Jun. 1, 2023

(51) Int. Cl.
*H04L 45/00* (2022.01)
*H04L 41/147* (2022.01)
*H04L 45/02* (2022.01)

(52) U.S. Cl.
CPC ............ *H04L 45/46* (2013.01); *H04L 41/147* (2013.01); *H04L 45/08* (2013.01)

(58) Field of Classification Search
CPC ...... H04L 47/127; H04L 47/25; H04L 47/283
See application file for complete search history.

(56) References Cited

U.S. PATENT DOCUMENTS

| 8,578,465 | B2* | 11/2013 | Xiao | H04L 67/141 |
| | | | | 709/224 |
| 9,736,056 | B2 | 8/2017 | Vasseur et al. | |
| 10,282,458 | B2 | 5/2019 | Gupta et al. | |
| 10,735,273 | B2 | 8/2020 | Kaplunov et al. | |
| 10,742,673 | B2 | 8/2020 | Tiagi et al. | |
| 11,151,457 | B1* | 10/2021 | Dawn | G06N 3/126 |
| 2008/0103847 | A1* | 5/2008 | Sayal | G06Q 30/04 |
| | | | | 705/7.37 |
| 2015/0369705 | A1* | 12/2015 | Kruglick | G06Q 10/10 |
| | | | | 702/188 |
| 2016/0028637 | A1* | 1/2016 | Vasseur | H04L 47/283 |
| | | | | 370/235 |
| 2017/0213227 | A1* | 7/2017 | Johnson | G06Q 30/0202 |
| 2019/0180141 | A1 | 6/2019 | Tiagi et al. | |
| 2020/0145325 | A1* | 5/2020 | LaVigne | H04L 45/02 |
| 2020/0201646 | A1* | 6/2020 | Thompto | G06F 9/3804 |
| 2021/0103830 | A1 | 4/2021 | Liu et al. | |

* cited by examiner

*Primary Examiner* — Mansour Oveissi
(74) *Attorney, Agent, or Firm* — Lee & Hayes, P.C.; James M. Behmke

(57) ABSTRACT

In one embodiment, a device forms a plurality of clusters of network paths used to convey traffic for an online application by applying clustering to telemetry data for those network paths. The device determines a predictability metric for a particular cluster in the plurality of clusters. The device provides an indication of the predictability metric for the particular cluster for display. The device enables, based in part on the predictability metric, predictive routing for the network paths in the particular cluster.

18 Claims, 11 Drawing Sheets

SELECTING PATHS FOR HIGH PREDICTABILITY USING CLUSTERING

TECHNICAL FIELD

The present disclosure relates generally to computer networks, and, more particularly, to selecting paths for high predictability using clustering.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QOS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, testing has shown that certain paths are better suited for predictive routing solutions than others. Indeed, different paths in the same network may exhibit very different degrees of predictability.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
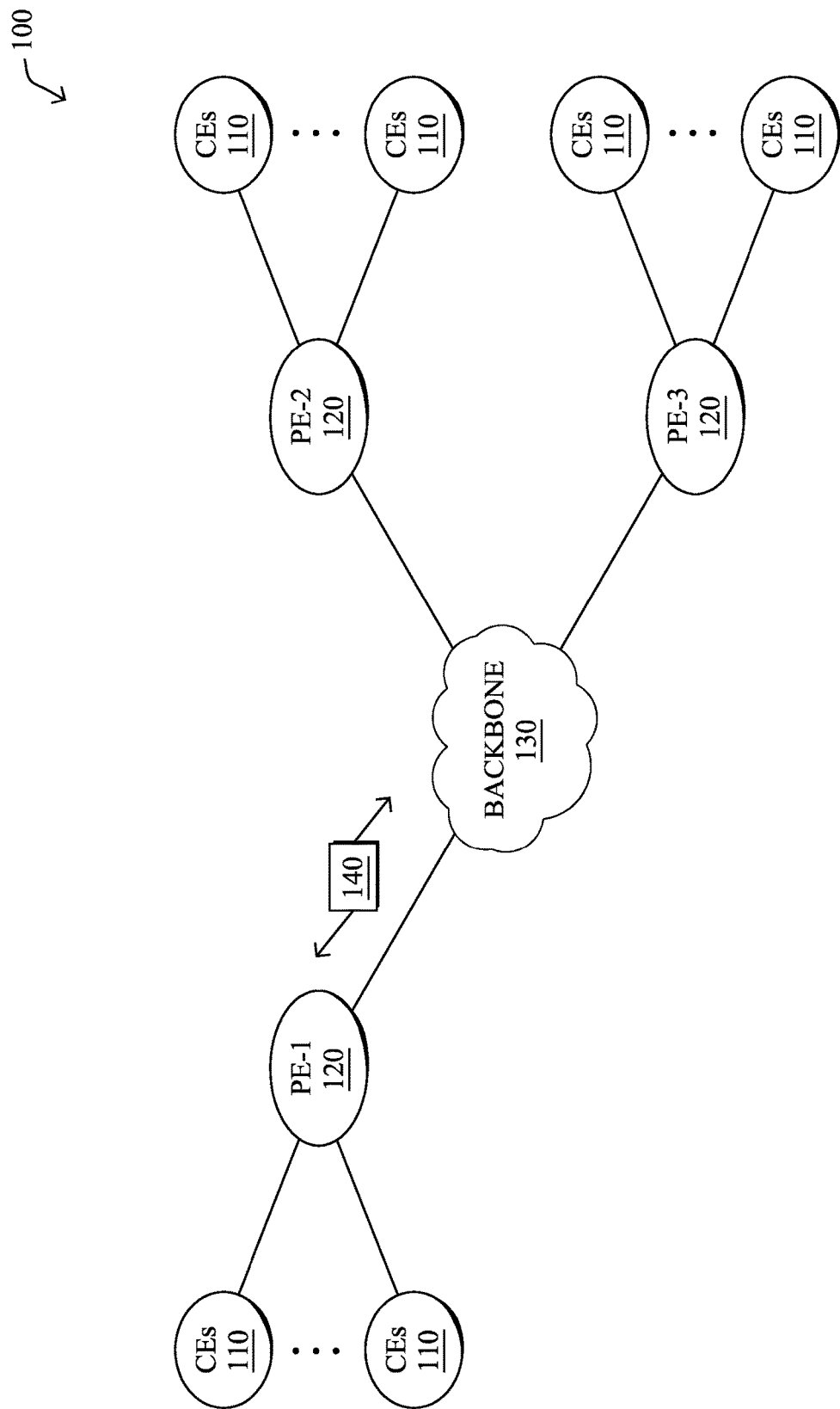
FIGS. 1A-1B illustrate an example communication network.

According to one or more embodiments of the disclosure, a device forms a plurality of clusters of network paths used to convey traffic for an online application by applying clustering to telemetry data for those network paths. The device determines a predictability metric for a particular cluster in the plurality of clusters. The device provides an indication of the predictability metric for the particular cluster for display. The device enables, based in part on the predictability metric, predictive routing for the network paths in the particular cluster.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
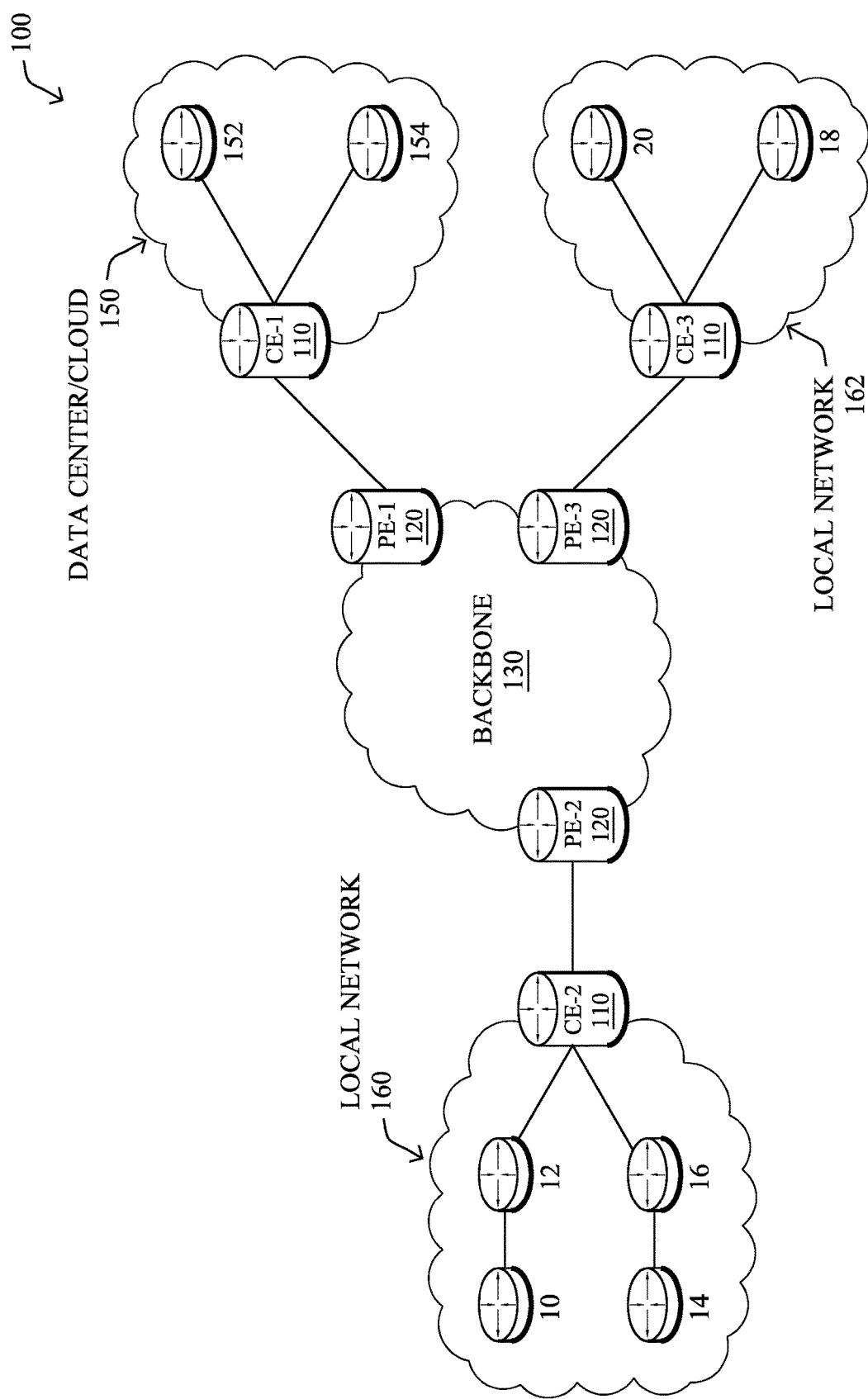

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
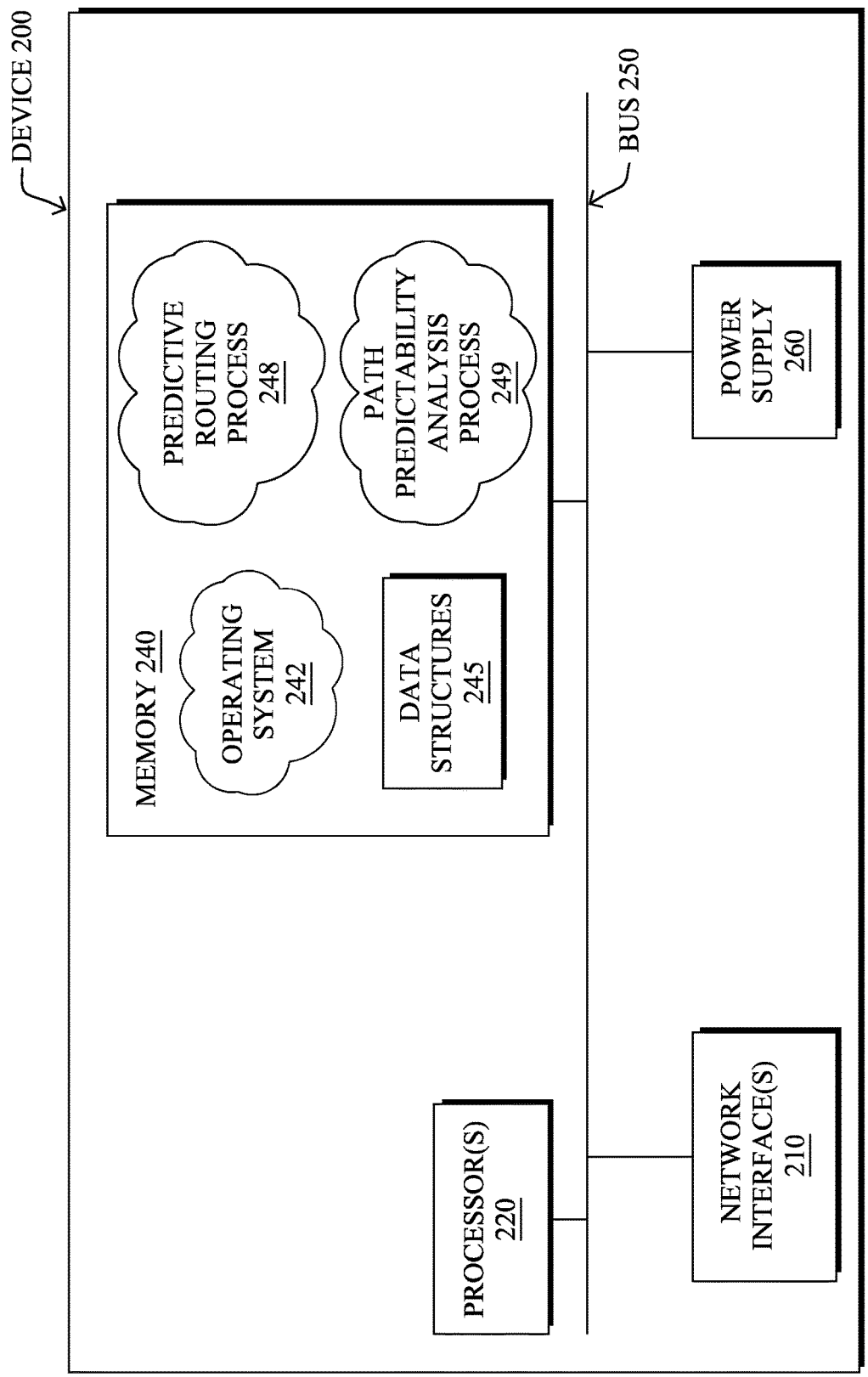
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a path predictability analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or path predictability analysis process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or path predictability analysis process 249 may include computer executable instructions that, when executed by processor(s) 220, cause device 200 to perform the techniques described herein. To do so, in some embodiments, predictive routing process 248 and/or path predictability analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or path predictability analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or path predictability analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory KPI metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
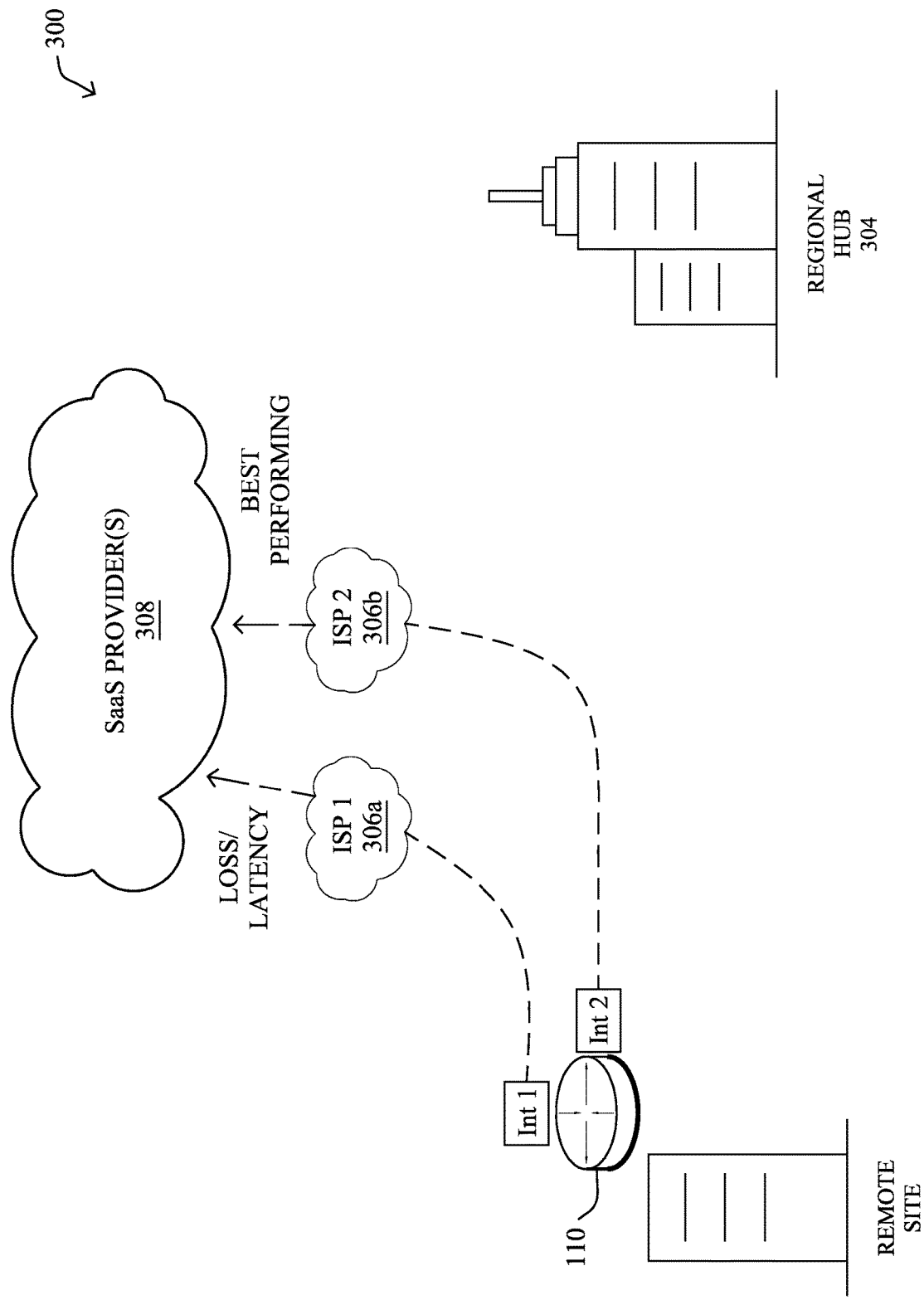
FIGS. 3A-3B illustrate example network deployments.
Figure 3B:
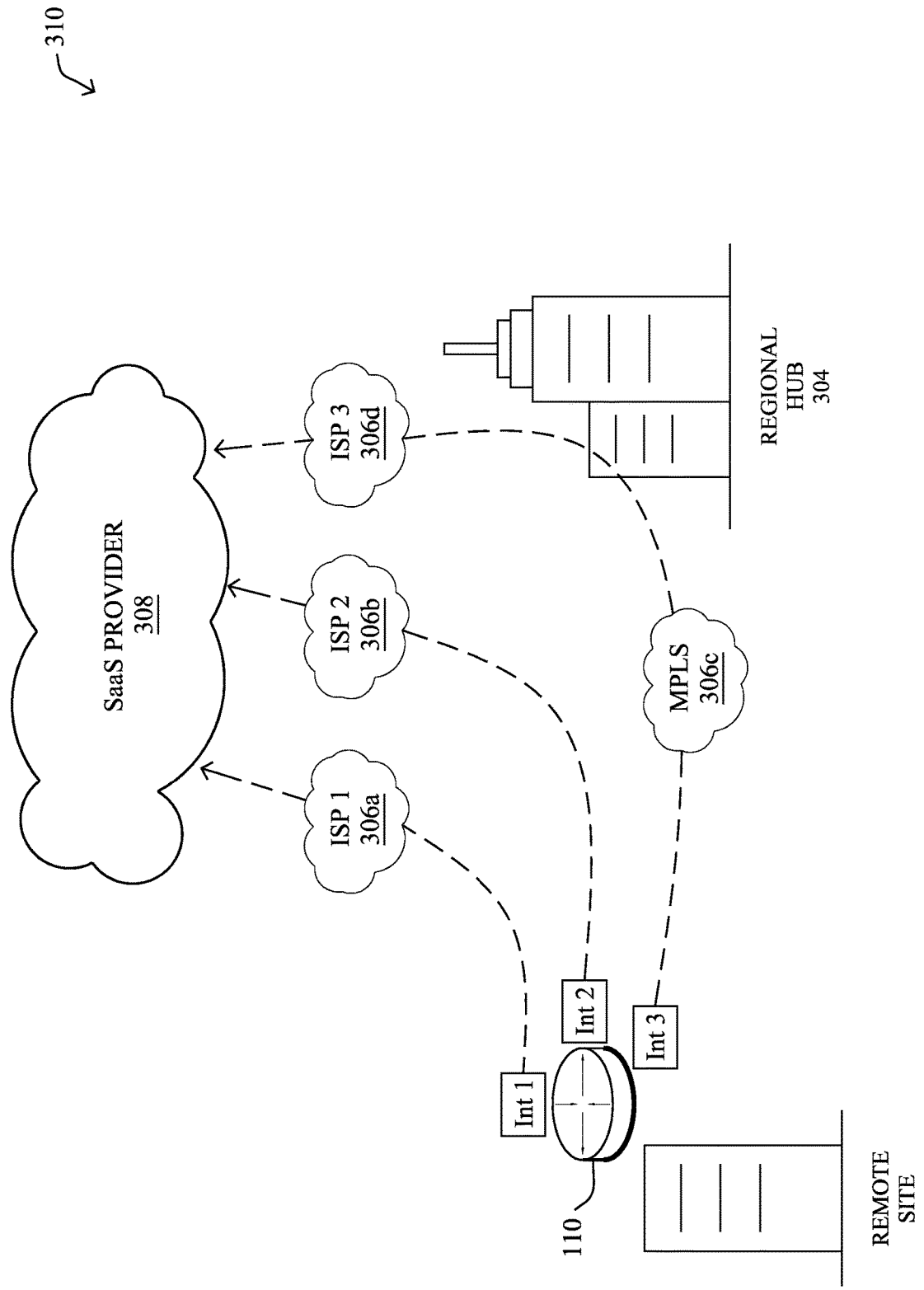

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
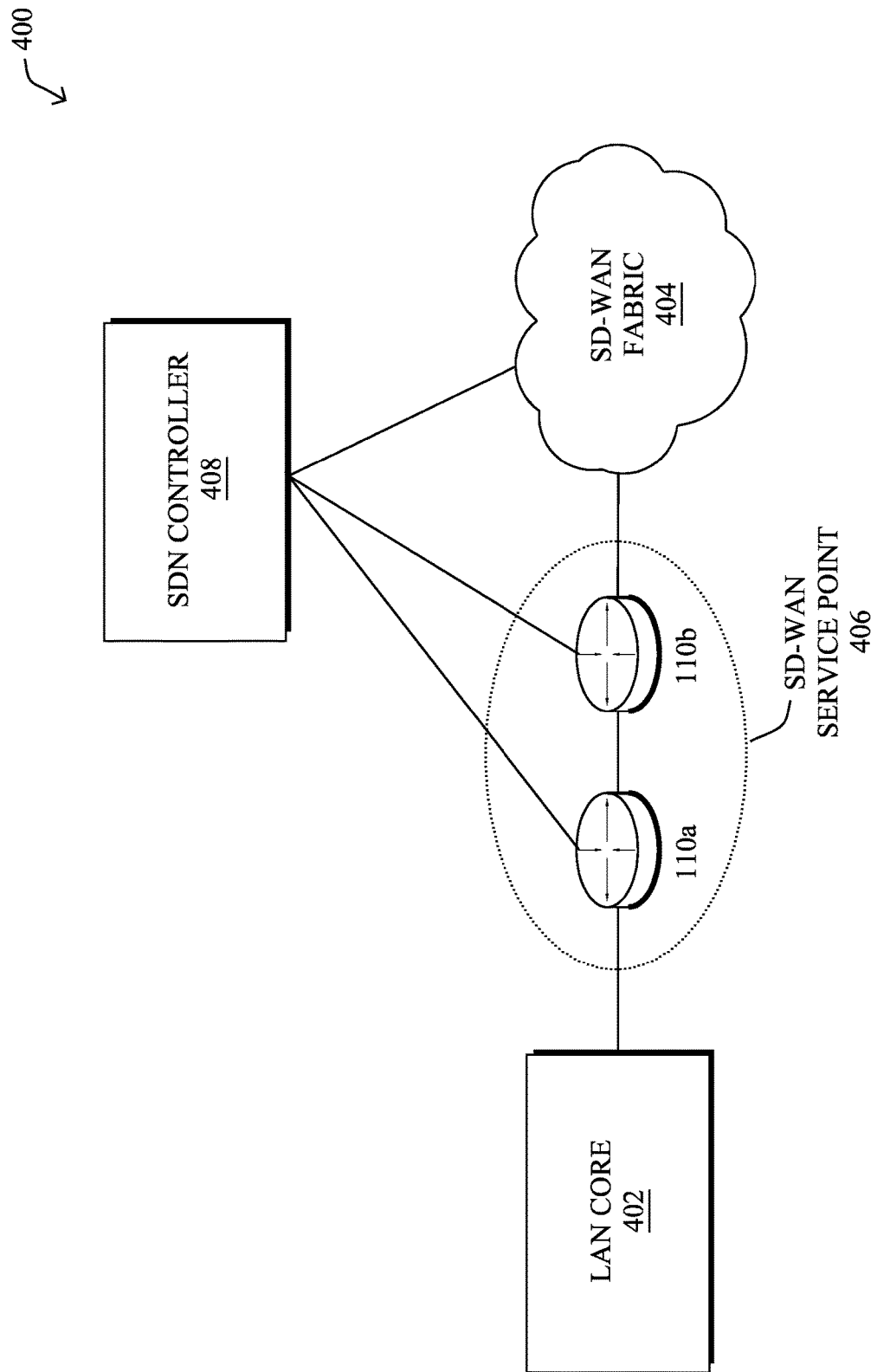
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
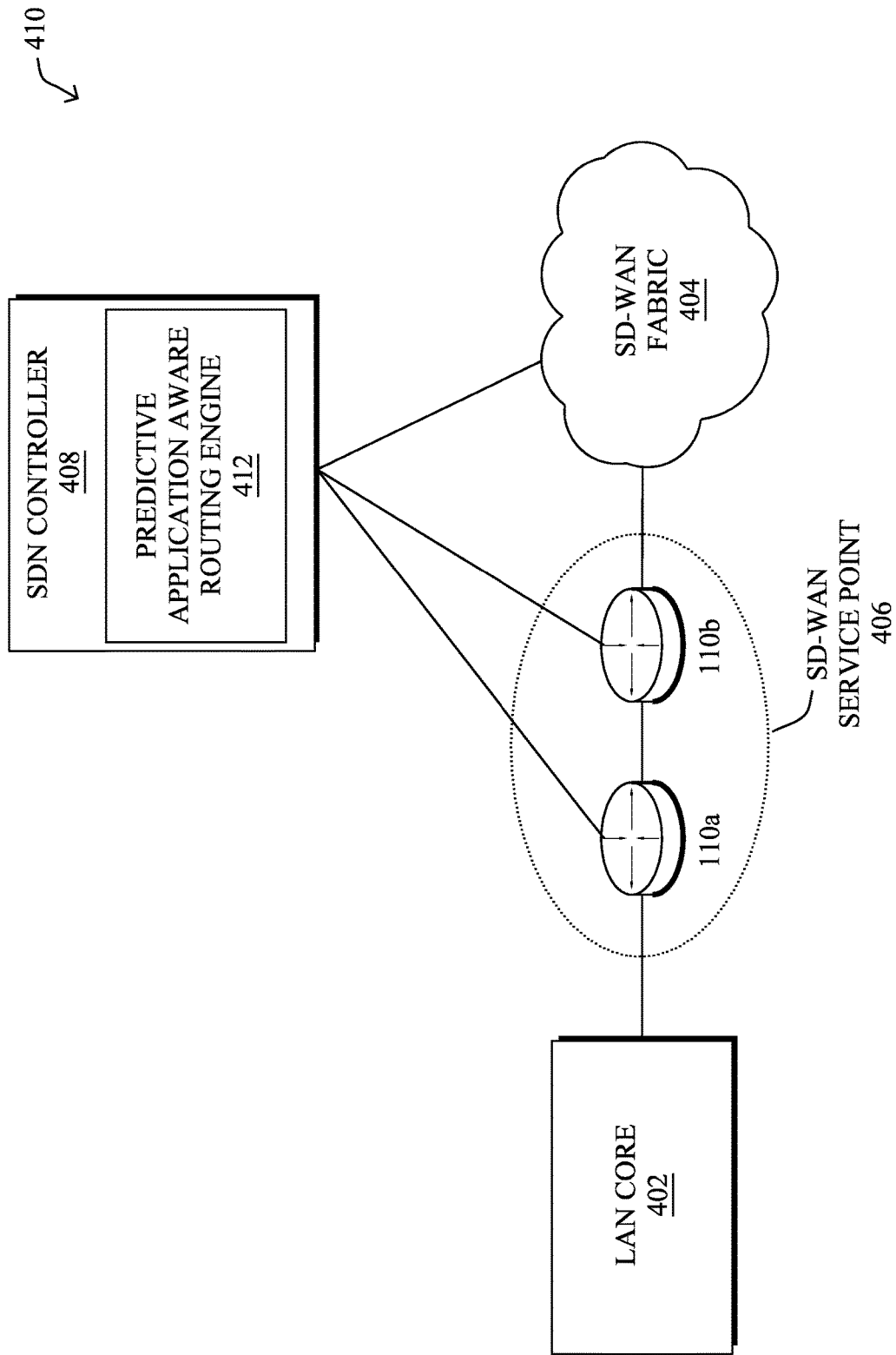

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, application-driven, predictive routing systems, such as predictive application aware routing engine 412, forecast events that are prone to disrupting application experience on a given network path so as to proactively reroute traffic away from the path with disruptions. However, testing has shown that the predictability of such disruption events varies largely across the paths and thus require different strategies for forecasting/routing. Indeed, forecasting disruptions for paths that inherently have low predictability can lead to bad routing decisions and even wasted resources. This is a very strong challenge for predictive application aware routing engine 412, which may strongly perform on some paths in terms of predictability while under performing badly on other paths.

Testing has shown that paths with certain characteristics have higher predictability for a certain type of forecasting approach than others. For example, paths that always have the same loss, latency and jitter, or paths that have very strong periodic signals (e.g., latency always jumps from 100 to 300 ms during work hours) are much more predictable than paths that are very noisy.

Another consideration for a forecasting engine such as predictive application aware routing engine 412 is the resource usage for training and inferring forecasting models. For example, neural networks are known for modeling complex non-linear timeseries signals, but are also expensive in terms of computational resources and cost. On the other end, simple Ordinary Least Squares (OLS) regression and Autoregressive Integrated Moving Average (ARIMA)-based forecasting models can be trained at a fraction of the computational resources. Hence, balancing computational resources and accuracy for a predictive model is often overlooked when implementing predictive routing systems. However, such a balance is not straight-forward due to the diversity of paths dynamics, as many networks include tens of thousands of different paths. Consequently, it is infeasible for a designer or developer of a predictive routing engine to go through every network path and decide which forecasting algorithm to use based on the path characteristic and resource overhead. In addition, paths often change their characteristics over time, which could invalidate such selections.

——Selecting Paths for High Predictability Using Clustering——

The techniques introduced herein optimize the performance and resource consumption of predictive systems built for network paths, such as predictive routing systems. In some aspects, the techniques herein use clustering to condense a large number of network paths into more interpretable sets of path clusters in which paths with similar path characteristics are grouped together. The system leverages the fact that the paths belonging to the same cluster have very similar predictability, in order to choose the path clusters having very high predictability and/or importance. In further aspects, a user may be provided with information regarding these highly predictable path clusters, which may be selected to close-the-loop by enabling predictive routing for them. In doing so, the system reduces the effects of bad predictions on the larger predictive system and also reduces the resource consumption. In a further aspect, the techniques herein can also be used to monitor changes in the characteristics of the network paths and alert the user as to any possible requirements to update previous decisions.

Illustratively, the techniques described herein may be performed by hardware, software, and/or firmware, such as in accordance with path predictability analysis process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device forms a plurality of clusters of network paths used to convey traffic for an online application by applying clustering to telemetry data for those network paths. The device determines a predictability metric for a particular cluster in the plurality of clusters. The device provides an indication of the predictability metric for the particular cluster for display. The device enables, based in part on the predictability metric, predictive routing for the network paths in the particular cluster.

Figure 5:
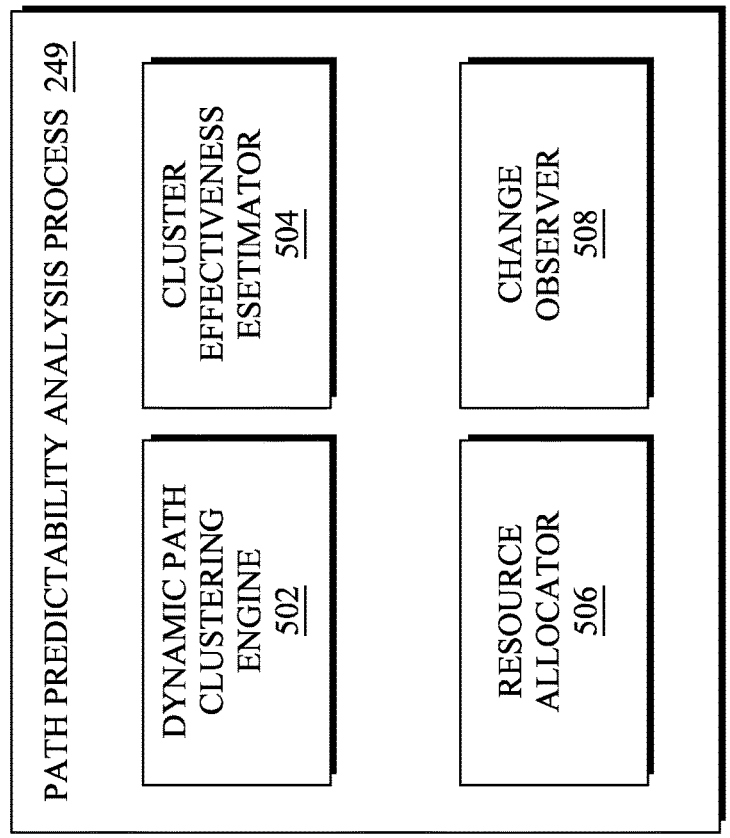
FIG. 5 illustrates an example architecture for selecting paths for high predictability using clustering.

Operationally, in various embodiments, FIG. 5 illustrates an example architecture 500 for selecting paths for high predictability using clustering, according to various embodiments. At the core of architecture 500 is path predictability analysis process 249, which may be executed by a controller for a network, a networking device, or another device in communication therewith. For instance, path predictability analysis process 249 may be executed by a controller for a network (e.g., SDN controller 408 in FIGS. 4A-4B), a particular networking device in the network (e.g., a router, etc.), another device or service in communication therewith, or the like. In some embodiments, for instance, path predictability analysis process 249 may be used to implement a predictive application aware routing engine, such as predictive application aware routing engine 412, or another supervisory service for the network.

As shown, path predictability analysis process 249 may include any or all of the following components: a dynamic path clustering engine 502, a cluster effectiveness estimator 504, a resource allocator 506, and/or a change observer 508. As would be appreciated, the functionalities of these components may be combined or omitted, as desired (e.g., implemented as part of predictive routing process 248). In addition, these components may be implemented on a singular device or in a distributed manner, in which case the combination of executing devices can be viewed as their own singular device for purposes of executing path predictability analysis process 249.

During operation, dynamic path clustering engine 502 may be configured to cluster paths in a network, based on their associated characteristics/metrics. In various embodiments, dynamic path clustering engine 502 may obtain such information from a datalake (e.g., a datalake on which predictive routing process 248 operates) or may collect such information, directly. For instance, dynamic path clustering engine 502 may collect path telemetry data for a path regarding measured KPIs such as loss, latency, jitter, etc., at a given frequency Fi for a period of time Ti along each path of interest Pi. This can be done either on a pull basis by sending a request to one or more networking devices for the telemetry data or on a push basis, where the telemetry data is sent to dynamic path clustering engine 502, automatically. In one embodiment, telemetry could be gathered by dynamic path clustering engine 502 using time based telemetry (streaming). In another embodiment, a (more exhaustive) data gathering campaign may be triggered by dynamic path clustering engine 502 to gather a rich set of telemetry variables to a collection of routers in the network.

In yet another embodiment, the techniques herein may be limited to a specific set of paths (paths carrying a given set of (critical) applications, a high volume of traffic, etc.), as configured by a user. In addition, another function of dynamic path clustering engine 502 may be to compute time series from the received path metrics for the various network paths.

If available, dynamic path clustering engine 502 may also obtain telemetry data indicative of user satisfaction scores for a given online application whose traffic is routed via a particular path. For instance, the online application itself may include a mechanism that allows users to rate their satisfaction with the performance of the online application (e.g., rating a videoconference on a scale of 0-5 stars, etc.). In other instances, user satisfaction information can be captured through agents, polling mechanisms (e.g., email, text, etc.), or the like. Regardless, dynamic path clustering engine 502 may access this information via an application programming interface (API) associated with the system responsible for capturing or reporting such information. Telemetry collector 602 may further obtain configuration or other information for the various paths, such as their SLA templates, their path types (e.g., business Internet, MPLS, public Internet, etc.), geographic information, service provider information, etc.

In turn, dynamic path clustering engine 502 may process and cluster the collected path telemetry, to create a plurality of path clusters, each of which includes network paths that exhibit very similar path characteristics. The similarity in the paths belonging to the same cluster implies that the all the paths belonging to the cluster enjoy very similar predictability for any forecasting approach. This is an important property, since the purity of a cluster is dictated by the similarity of prediction accuracies for all members of a cluster.

In one embodiment, dynamic path clustering engine 502 may first make use of a dimensionality reduction approach, to reduce the telemetry into a lower-dimensional space and employ clustering approaches, such as DBSCAN, to create clusters of paths. The dimensionality reduction would be done such that the paths with similar patterns in disruptions/path characteristics occur closer to each other. The clustering approach then groups these closely occurring paths into the same cluster. Dynamic path clustering engine 502 may also compute clustering metrics for the plurality of clusters that measure the tightness of a given cluster (e.g., Silhouette index), indicating the extent to which the paths belonging to a cluster are similar in terms of their characteristics.

Figure 6A:
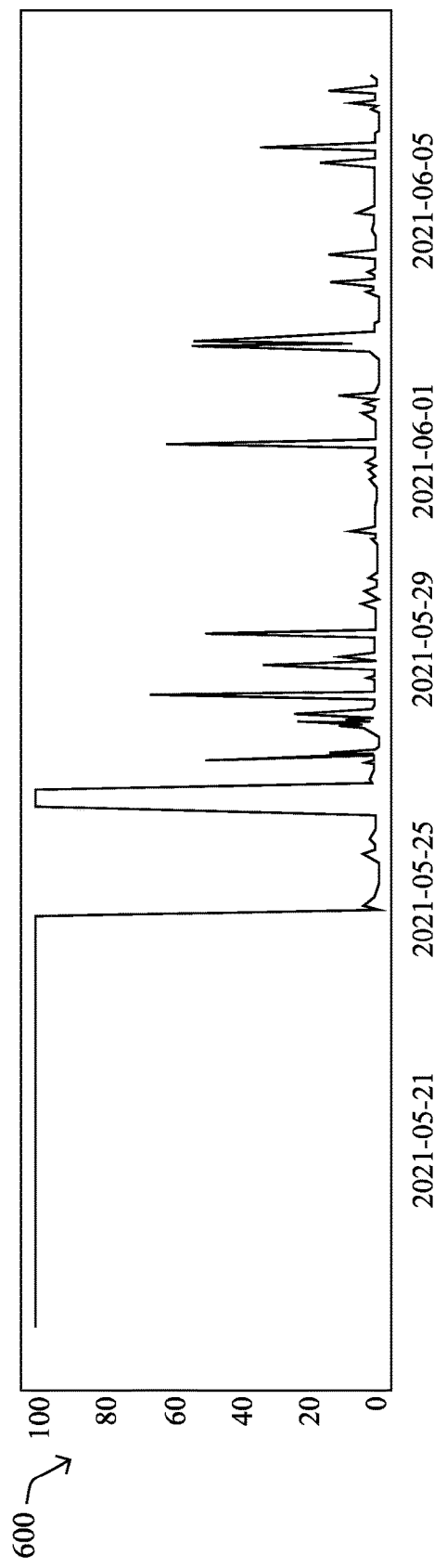
FIGS. 6A-6B illustrate example plots of timeseries for the probability of service level agreement (SLA) violations by different path clusters.
Figure 6B:
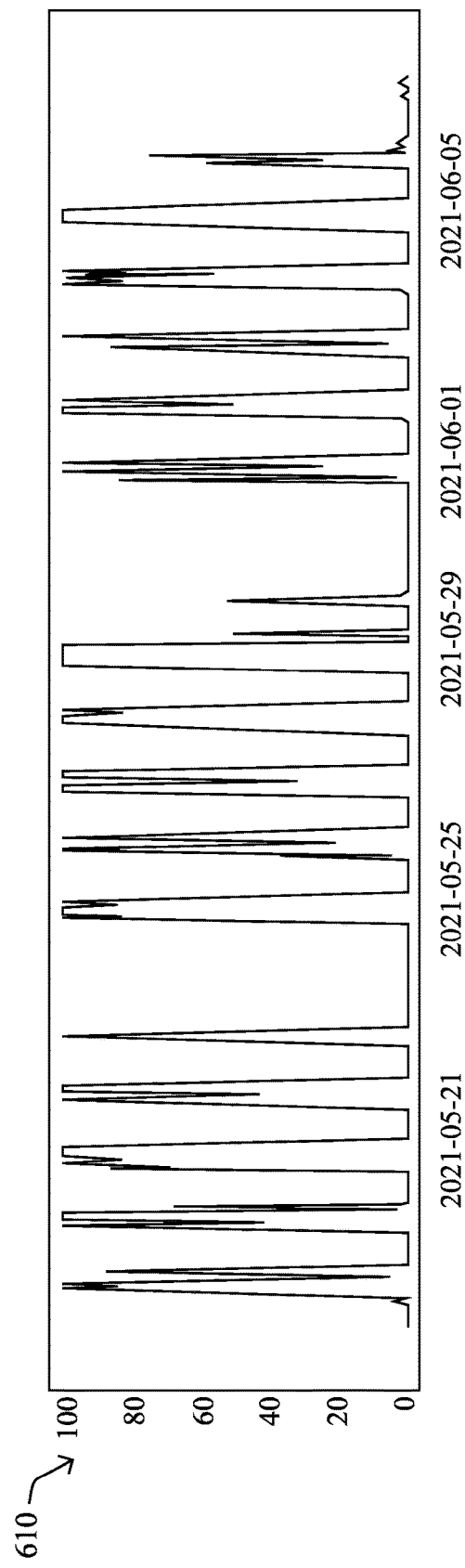

FIGS. 6A-6B illustrate example plots of timeseries for the probability of service level agreement (SLA) violations by different path clusters. More specifically, FIG. 6A illustrates a plot 600 of the probability of SLA violations of a first cluster of network paths formed during testing. These clusters were formed by first applying a Uniform Manifold Approximation (UMAP) dimensionality reduction to the telemetry data for the paths, and then clustering the results using DBSCAN. As can be seen in plot 600, these paths all demonstrate very similar change points and peaks with respect to their probabilities of SLA violations. FIG. 6B illustrates another plot 610 of the probability of SLA violations for another cluster of the network paths. Here, it can be seen in plot 610 that the paths in this cluster all exhibit very similar seasonal behavior with respect to their SLA violations.

Referring again to FIG. 5, cluster effectiveness estimator 504 may be responsible for ranking the effectiveness of the path clusters from dynamic path clustering engine 502 and choosing the right forecasting approach for them, in various embodiments. By way of example, consider the cluster of network paths associated with plot 610 in FIG. 6B, whose SLA violations alternate between states of being effectively zero probability to being extremely probable. This shows that forecasting over such paths is important because dynamically rerouting when the paths are bad is vital to avoid bad user experience with the online application.

Another interesting characteristic of the cluster underlying plot 610 is that the behavior of their SLA violations is periodic in nature (e.g., the probability of SLA violations on workdays peaks to 1.0). Such perfectly periodic signals can be optimized using lightweight forecasting algorithms that do not require significant resource consumption, such as seasonal timeseries models (e.g., Holt-Winters) or an OLS regression model that considers seasonal features. Cluster effectiveness estimator 504 detecting such clusters of important paths presents a new opportunity to optimize the predictive routing system by opting to use a forecasting model for these paths that requires reduced resource consumption over other possible forecasting models.

According to various embodiments, cluster effectiveness estimator 504 may compute predictability metrics for the various path clusters formed by dynamic path clustering engine 502, on which it may base its assessments. Such predictability metrics may be computed either on a subset of the paths of a given cluster or across the entire set of paths in the cluster. In general, the predictability metric for a path cluster quantifies how well a forecasting model will be able to predict the behavior of the paths in that cluster (e.g., in terms of SLA violations, unacceptable user satisfaction scores, etc.).

In some embodiments, cluster effectiveness estimator 504 may compute multiple predictability metrics for a given cluster, such as to quantify its predictability for different types of forecasting models. For instance, some clusters could have good predictability metrics for even lightweight forecasting approaches like OLS regression, while other clusters with complex patterns might only have good predictability metrics for resource intensive, non-linear approaches such as a long short-term memory (LSTM) forecaster. In one embodiment, cluster effectiveness estimator 504 may base the predictability metrics for the clusters on precision and/or recall metrics associated with forecasting application experience disruptions. Here, the precision/recall quantifies the fraction of disruptions that were predicted by the one or more forecasting approaches being evaluated by cluster effectiveness estimator 504.

In addition to predictability, cluster effectiveness estimator 504 may also take into account other factors, when evaluating how eligible a given cluster is for predictive routing. For instance, cluster effectiveness estimator 504 may compare one or more policy rules to the criticality of the online application, the amount of traffic being conveyed by the paths in the cluster, the type/color of the paths in the cluster (e.g., public Internet, MPLS, cellular, etc.), to assign an importance to the paths in the cluster. This presents the opportunity for certain paths to be filtered out from being subject to predictive routing. Indeed, not enabling predictive routing for paths of low importance can also decrease the overall resource consumption by the predictive routing system.

In various embodiments, cluster effectiveness estimator 504 may then select a subset of the path clusters that are the best candidates for predictive routing, based on their predictability metric(s) and/or importance information. For example, a user-based policy may be used to exclude paths/clusters that do not meet a specific policy (e.g., paths that do not carry specific types of applications, their volume of traffic is too low, etc.).

Figure 7:
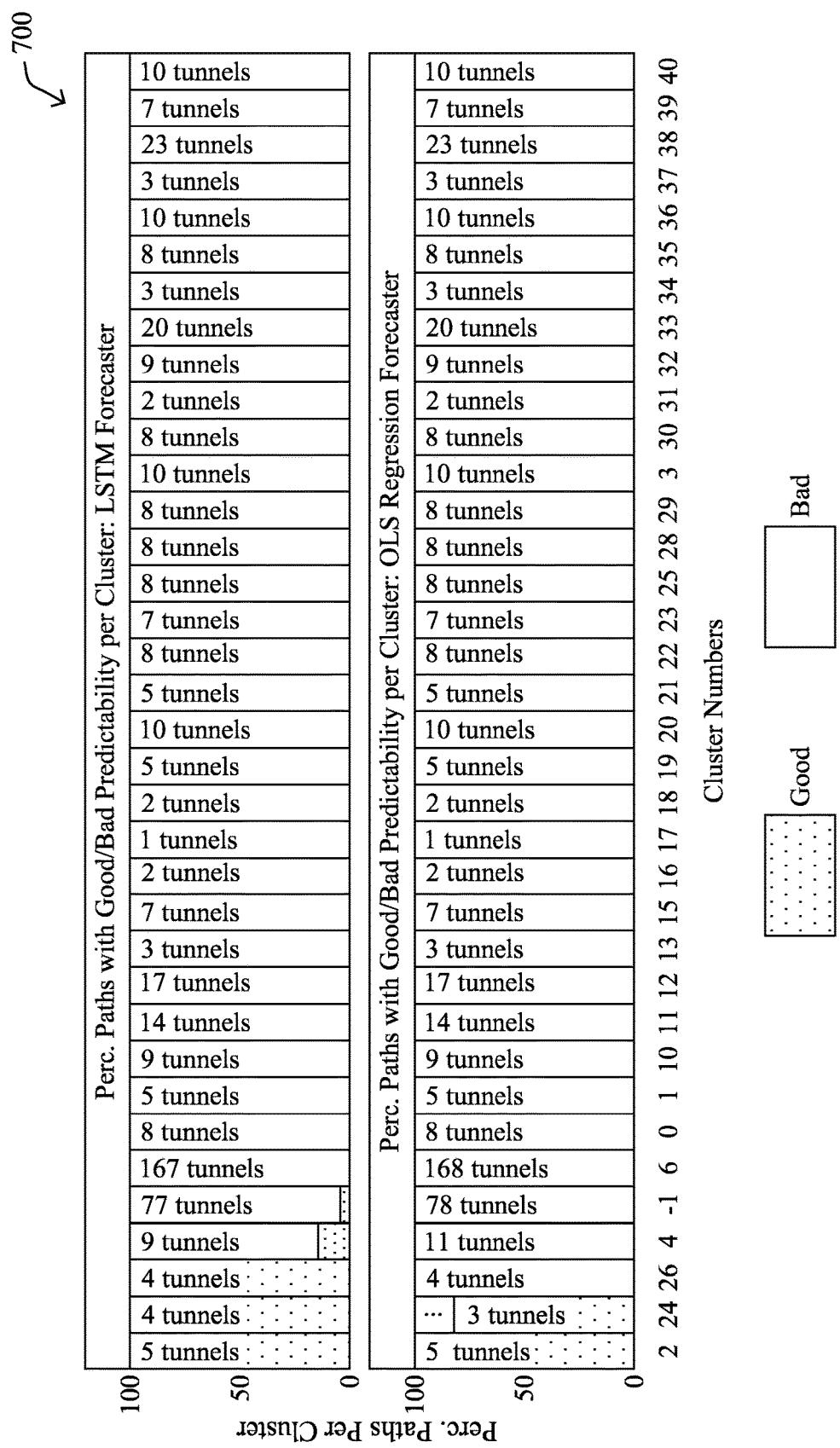
FIG. 7 illustrates an example plot showing the predictability of different path clusters using different forecasting models.

By way of example, FIG. 7 shows a plot 700 of the predictability of each of a set of clusters using two different forecasting approaches: an LSTM-based forecasting model and an OLS regression-based forecasting model. For illustrative purposes, the predictability metrics for the clusters have been categorized as either 'good' or 'bad,' such as based on whether the precision/recall is considered acceptable for a given forecasting approach and path cluster. Here, it can be seen that cluster 2 in plot 700 has 'good' predictability for both forms of forecasting models. In contrast, cluster 26 offers good predictability when an LSTM-based forecasting model is used, but bad predictability when an OLS regression forecasting model is used.

Referring again to FIG. 5, resource allocator 506 may be responsible for providing suggestions to a user on the path clusters that are most effective for predictive routing and rerouting traffic, dynamically, in various embodiments. To do so, resource allocator 506 may consume the information on the path clusters along with their predictability metrics (and importance information) from cluster effectiveness estimator 504 and dynamic path clustering engine 502. In addition, resource allocator 506 may also take into account resource constraints and/or optimization criteria for the predictive routing system. Based on this, resource allocator 506 may suggest enabling predictive routing for certain clusters of network paths that would maximize the benefits to the user's network.

In one embodiment, resource allocator 506 may provide the top path clusters ranked by cluster effectiveness estimator 504 for display to a user, based in part on their predictability metrics and/or importance information. In addition, in some embodiment, resource allocator 506 may also show resource consumption information associated with enabling predictive routing for a certain path cluster, should the user opt to do so. In other words, the user may provide instructions to resource allocator 506, to enable predictive routing for a certain cluster of network paths.

In another embodiment, the user can simply enter the available resources and optimization criterion to resource allocator 506, for which resource allocator 506 selects the optimal set of path clusters for which predictive routing should be enabled and/or the specific types of forecasting models for those clusters. For example, the resource constraints could indicate the size of the available cloud resources in a datacenter, the frequency of path training, the maximum lag between receiving the telemetry to producing a routing patch, combinations thereof, or the like. Example optimization criteria could be priorities on the type of traffic, acceptable error-margins, priorities on edge devices, etc.

Of course, in further embodiments, resource allocator 506 may simply select the set of path clusters for which predictive routing, automatically. In other words, while a user may be presented with certain information and make the final decision in some cases, other implementations may entail the system itself performing these functions.

In another embodiment, resource allocator 506 may also learn over time which path clusters to suggest to a user. More specifically, the user and resource allocator 506 may iteratively select path clusters that fit the available resources and those that offer a precision that minimizes the risk of using a fully automated, closed-loop approach. The decisions from the user on which set of paths to enable predictive routing can then be used by the predictive systems to selectively train/predict and apply routing policies.

As would be appreciated, the characteristics of the time-series for any path telemetry data is likely to change over time, which could lead to changes in the clusters or the predictability of the clusters. To this end, path predictability analysis process 249 may also include change observer 508, which is responsible for detecting such changes to the clusters and/or the predictability metrics of the clusters. More specifically, change observer 508 may detect changes such as deviations of the paths from their original cluster, changes in predictability metrics of the clusters, changes in other network characteristics of the clusters, changes within the clustering like creation/merging of clusters, etc. Once such a change is detected, change observer 508 may send an alert to the user informing them of the changes. In addition, change observer 508 may also suggest changes to the current configuration and/or disable predictive routing for a certain path cluster, if appropriate.

Another potential functionality of change observer 508 may be to track when a certain network path jumps from one cluster to another over time. Indeed, path characteristics may change over time due to a change of path across the Internet, capacity provisioning, or even traffic forwarded along that path. Thus, on expiration of a timer, dynamic path clustering engine 502 may recompute the path clusters and change observer 508 may check whether a path has moved or not to a new cluster. When such an event happens and the new cluster provides similar prediction performance, change observer 508 may opt to take no action. However, in the opposite case in which the new cluster has worse predictability metrics, change observer 508 may take measures such as alerting a user and/or disabling predictive routing for that path (e.g., if the predictability metric is below a defined threshold).

Figure 8:
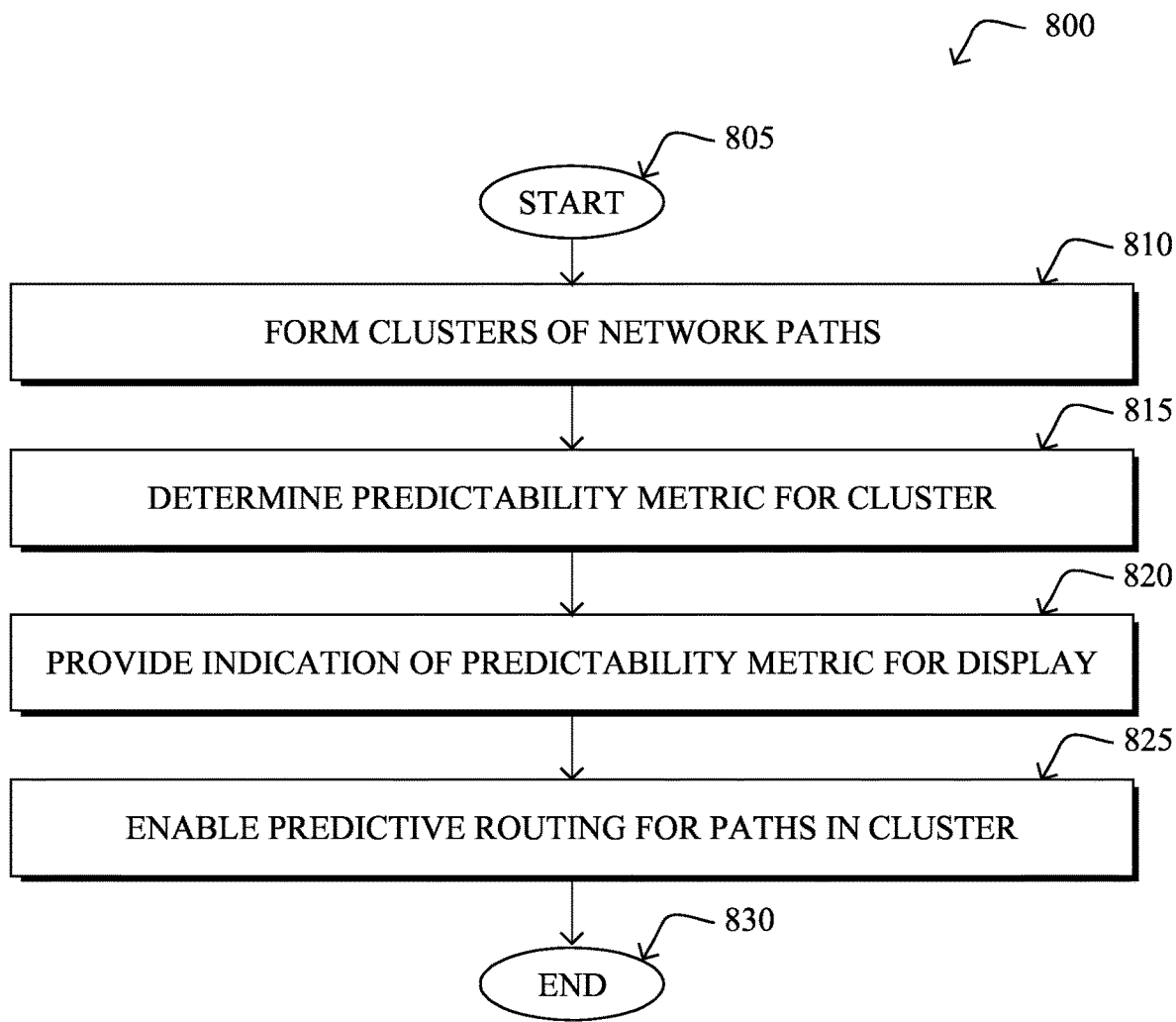
FIG. 8 illustrates an example simplified procedure for selecting paths for high predictability using clustering.

FIG. 8 illustrates an example simplified procedure 800 (e.g., a method) for selecting paths for high predictability using clustering, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 800 by executing stored instructions (e.g., path predictability analysis process 249). The procedure 800 may start at step 805, and continues to step 810, where, as described in greater detail above, the device may form a plurality of clusters of network paths used to convey traffic for an online application (e.g., an SaaS application) by applying clustering to telemetry data for those network paths. In some embodiments, the telemetry data comprises at least one of: packet loss, delay, or jitter. In a further embodiment, the telemetry data is indicative of user satisfaction ratings for the online application.

At step 815, as detailed above, the device may determine a predictability metric for a particular cluster in the plurality of clusters. In some embodiments, the device may do so by determining how well each of a set of forecasting models are able to make predictions for the network paths in the particular cluster. In one embodiment, the predictability metric may be based on a precision or recall metric.

At step 820, the device may provide an indication of the predictability metric for the particular cluster for display, as described in greater detail above. For instance, the device may notify an administrator or other user as to the predictability of the paths in the particular cluster. In addition, the device may allow the user to perform actions such as requesting predictive routing for those paths, reviewing the resource consumptions associated with enabling predictive routing for those paths, and/or monitoring the predictability metric for the paths over time.

At step 825, as detailed above, the device may enable, based in part on the predictability metric, predictive routing for the network paths in the particular cluster. In one embodiment, the device may do so based in part on a comparison between a policy and at least one of: a criticality associated with the online application, a type of the network paths in the particular cluster, or a traffic volume associated with the network paths in the particular cluster. In another embodiment, the device may do so based in part on an instruction from a user interface to do so. In yet another embodiment, the device may do so by selecting one of a set of forecasting models to make predictions for the predictive routing, based in part on a resource consumption associated with that forecasting model. After enabling predictive routing for the particular cluster, the device may later disable the predictive routing for those paths, based in part on a determination that the predictability metric for the particular cluster has changed. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for selecting paths for high predictability using clustering, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   forming, by a device, a plurality of clusters of network paths used to convey traffic for an online application by applying clustering to telemetry data for those network paths;
   determining, by the device, a predictability metric for a particular cluster of network paths in the plurality of clusters of network paths, wherein the predictability metric indicates how accurately behavior of given network paths in the particular cluster of network paths is able to be predicted for two or more forecasting models;
   presenting, by the device and to a display via a user interface, an indication of the predictability metric for the particular cluster of network paths; and
   enabling, by the device and after presenting the predictability metric, predictive routing for the particular cluster of network paths based on receiving an instruction to enable the predictive routing, wherein the instruction is obtained from a user via the user interface.

2. The method as in claim 1, wherein the telemetry data comprises at least one of: packet loss, delay, or jitter.

3. The method as in claim 1, wherein the telemetry data is indicative of user satisfaction ratings for the online application.

4. The method as in claim 1, wherein the device enables predictive routing for the particular cluster of network paths, based in part on a comparison between a policy and at least one of: a criticality associated with the online application, a type of network paths in the particular cluster of network paths, or a traffic volume associated with the particular cluster of network paths.

5. The method as in claim 1, wherein determining the predictability metric for the particular cluster of network paths comprises:
   determining how well each of a set of forecasting models are able to make predictions for the particular cluster of network paths.

6. The method as in claim 5, wherein enabling predictive routing for the particular cluster of network paths comprises:
   selecting one of the set of forecasting models to make predictions for the predictive routing, based in part on a resource consumption associated with that forecasting model.

7. The method as in claim 1, further comprising:
   disabling predictive routing for the particular cluster of network paths, based in part on a determination that the predictability metric for the particular cluster of network paths has changed.

8. The method as in claim 1, wherein the predictability metric is based on a precision or recall metric.

9. The method as in claim 1, wherein the online application is a software-as-a-service (SaaS) application.

10. An apparatus, comprising:
    one or more network interfaces;
    a processor coupled to the one or more network interfaces and configured to execute one or more processes; and
    a memory configured to store a process that is executable by the processor, the process when executed configured to:
    form a plurality of clusters of network paths used to convey traffic for an online application by applying clustering to telemetry data for those network paths;
    determine a predictability metric for a particular cluster of network paths in the plurality of clusters of network paths, wherein the predictability metric indicates how accurately behavior of given network paths in the particular cluster of network paths is able to be predicted for two or more forecasting models;
    provide, to a display via a user interface, an indication of the predictability metric for the particular cluster of network paths; and
    enable, after presenting the predictability metric, predictive routing for the particular cluster of network paths based on receiving an instruction to enable the predictive routing, wherein the instruction is obtained from a user via the user interface.

11. The apparatus as in claim 10, wherein the telemetry data comprises at least one of: packet loss, delay, or jitter.

12. The apparatus as in claim 10, wherein the telemetry data is indicative of user satisfaction ratings for the online application.

13. The apparatus as in claim 10, wherein the apparatus enables predictive routing for the particular cluster of network paths, based in part on a comparison between a policy and at least one of: a criticality associated with the online application, a type of network paths in the particular cluster of network paths, or a traffic volume associated with the particular cluster of network paths.

14. The apparatus as in claim 10, wherein the apparatus determines the predictability metric for the particular cluster of network paths by:
    determining how well each of a set of forecasting models are able to make predictions for the particular cluster of network paths.

15. The apparatus as in claim 14, wherein the apparatus enables predictive routing for the particular cluster of network paths by:
    selecting one of the set of forecasting models to make predictions for the predictive routing, based in part on a resource consumption associated with that forecasting model.

16. The apparatus as in claim 10, wherein the process when executed is further configured to:
    disable predictive routing for the particular cluster of network paths, based in part on a determination that the predictability metric for the particular cluster of network paths has changed.

17. The apparatus as in claim 10, wherein the predictability metric is based on a precision or recall metric.

18. A tangible, non-transitory, computer-readable medium storing program instructions that cause a device to execute a process comprising:
    forming, by the device, a plurality of clusters of network paths used to convey traffic for an online application by applying clustering to telemetry data for those network paths;
    determining, by the device, a predictability metric for a particular cluster of network paths in the plurality of clusters of network paths, wherein the predictability metric indicates how accurately behavior of given network paths in the particular cluster of network paths is able to be predicted for two or more forecasting models;
    presenting, by the device and to a display via a user interface, an indication of the predictability metric for the particular cluster of network paths; and enabling, by the device and after presenting the predictability metric, predictive routing for the particular cluster of network paths based on receiving an instruction to enable the predictive routing, wherein the instruction is obtained from a user via the user interface.

\* \* \* \* \*